US010759700B2

(12) United States Patent
Gimeno et al.

(10) Patent No.: US 10,759,700 B2
(45) Date of Patent: Sep. 1, 2020

(54) THREE COMPONENT COMPOSITION FOR THE MANUFACTURE OF POLYURETHANE CEMENTITIOUS HYBRID FLOORING OR COATING WITH IMPROVED SURFACE GLOSS

(71) Applicant: SIKA TECHNOLOGY AG, Baar (CH)

(72) Inventors: Patricia Gimeno, Stuttgart (DE); Carola Kaddatz, Aspach (DE); Jochen Grötzinger, Schwäbisch Gmünd (DE); Hans Gantner, Nenzing (AT)

(73) Assignee: SIKA TECHNOLOGY AG, Baar (CH)

( * ) Notice: Subject to any disclaimer, the term of this patent is extended or adjusted under 35 U.S.C. 154(b) by 500 days.

(21) Appl. No.: 15/311,770

(22) PCT Filed: May 12, 2015

(86) PCT No.: PCT/EP2015/060420
§ 371 (c)(1),
(2) Date: Nov. 16, 2016

(87) PCT Pub. No.: WO2015/173214
PCT Pub. Date: Nov. 19, 2015

(65) Prior Publication Data
US 2017/0096368 A1 Apr. 6, 2017

(30) Foreign Application Priority Data
May 16, 2014 (EP) ..................... 14168704

(51) Int. Cl.
C04B 11/30 (2006.01)
C04B 28/00 (2006.01)
C04B 28/12 (2006.01)
C08G 18/48 (2006.01)
C04B 40/06 (2006.01)
C08G 18/76 (2006.01)
C09D 175/08 (2006.01)
C04B 28/04 (2006.01)
C08G 18/28 (2006.01)
C09D 175/04 (2006.01)
C04B 28/10 (2006.01)
C04B 103/00 (2006.01)
C04B 111/00 (2006.01)
C04B 111/62 (2006.01)
C04B 111/20 (2006.01)
C04B 111/60 (2006.01)

(52) U.S. Cl.
CPC ............ C04B 28/003 (2013.01); C04B 11/30 (2013.01); C04B 28/04 (2013.01); C04B 28/10 (2013.01); C04B 28/12 (2013.01); C04B 40/065 (2013.01); C08G 18/2835 (2013.01); C08G 18/4825 (2013.01); C08G 18/4829 (2013.01); C08G 18/7664 (2013.01); C09D 175/04 (2013.01); C09D 175/08 (2013.01); C04B 2103/0046 (2013.01); C04B 2111/00336 (2013.01); C04B 2111/00482 (2013.01); C04B 2111/20 (2013.01); C04B 2111/60 (2013.01); C04B 2111/62 (2013.01); Y02W 30/92 (2015.05)

(58) Field of Classification Search
CPC ....... C04B 28/003; C04B 11/30; C04B 28/10; C08G 18/16; C08G 18/18
USPC ............................................................ 524/650
See application file for complete search history.

(56) References Cited

U.S. PATENT DOCUMENTS

| 8,110,621 | B2 | 2/2012 | Kohler et al. | |
| 10,518,136 | B2 * | 12/2019 | Sullivan | ................. C08G 18/10 |
| 2008/0006383 | A1 * | 1/2008 | Park | ......................... C04B 28/26 |
| | | | | 162/181.6 |

(Continued)

FOREIGN PATENT DOCUMENTS

| JP | 2000-72507 A | 3/2000 |
| JP | 2000-80267 A | 3/2000 |

(Continued)

OTHER PUBLICATIONS

International Search Report dated Jul. 16, 2015 corresponding to International Patent Application No. PCT/EP2015/060420, 3 pages.
Written Opinion of the International Searching Authority dated Jul. 16, 2015 corresponding to International Patent Application No. PCT/EP2015/060420, 5 pages.
Examination Report dated Mar. 28, 2018 corresponding to Australian Patent Application No. 2015260997, 3 pages.
Official Action dated Oct. 31, 2017 corresponding to European Patent Application No. 15720747.3, 3 pages.
Office Action dated Oct. 30, 2018 in corresponding Japanese Patent Application No. 2016-567729, 6 pages.

(Continued)

Primary Examiner — Jane L Stanley
(74) Attorney, Agent, or Firm — Dentons US LLP

(57) ABSTRACT

The present invention relates to a three component composition consisting of a polyol component (A) comprising at least two polyols, one with high and one with low molecular weight, and water, a polyisocyanate component (B) comprising a methylene diphenyl diisocyanate (MDI) product with an average NCO functionality of at least 2.5, or a methylene diphenyl diisocyanate (MDI) product with an average NCO functionality of at least 2 and at least one further polyol with an amount of between 1% and 30% based on the weight of said polyisocyanate component (B), wherein said MDI product and said polyol have reacted at least partially, and a powder component (C) comprising at least one hydraulic binder, preferably cement and/or calcined paper sludge, preferably a calcium compound selected from calcium hydroxide and/or calcium oxide, and optionally one or more aggregates. Polyurethane cementitious hybrid flooring or coating systems having glossy/semiglossy surfaces, good workability and outstanding mechanical properties can be achieved. Blister formation can be avoided.

14 Claims, No Drawings

(56) References Cited

U.S. PATENT DOCUMENTS

| | | | |
|---|---|---|---|
| 2009/0197094 A1* | 8/2009 | Nakahara | C08G 63/42 428/423.7 |
| 2016/0244367 A1* | 8/2016 | Gimeno Santos | C04B 26/06 |
| 2017/0036960 A1* | 2/2017 | Conrad | C04B 26/16 |
| 2019/0039953 A1* | 2/2019 | Conrad | C04B 26/16 |

FOREIGN PATENT DOCUMENTS

| | | |
|---|---|---|
| JP | 2002-338318 A | 11/2002 |
| JP | 2003-26758 A | 1/2003 |
| JP | 2005-47719 A | 2/2005 |
| JP | 2006-206354 A | 8/2006 |
| JP | 2007254179 A | 10/2007 |
| JP | 2008-169062 A | 7/2008 |
| JP | 2010-58997 A | 3/2010 |
| JP | 2009203124 A | 9/2010 |
| JP | 2014-201643 A | 10/2014 |
| JP | 2016-526058 A | 9/2016 |
| JP | 2016-526059 A | 9/2016 |
| KR | 101252447 B1 | 4/2013 |
| RU | 2004125173 A | 1/2006 |
| WO | 96/06057 A1 | 2/1996 |
| WO | 03/059977 A1 | 7/2003 |
| WO | 2014/174093 A1 | 10/2014 |
| WO | WO 2014174033 A2 * 10/2014 | C08G 59/50 |

OTHER PUBLICATIONS

Office Action dated Dec. 14, 2018 in corresponding Russian Patent Application No. 2016143557, 16 pages.
Office Action dated Dec. 3, 2018 in corresponding Chinese Patent Application No. 201580033635.4, 13 pages.
Examination Report No. 2 dated Jul. 18, 2018 in corresponding to Australian Patent Application No. 2015260997, 2 pages.
Office Action dated Jul. 25, 2018 in corresponding European Patent Application No. 15720747.3, 3 pages.

* cited by examiner

THREE COMPONENT COMPOSITION FOR THE MANUFACTURE OF POLYURETHANE CEMENTITIOUS HYBRID FLOORING OR COATING WITH IMPROVED SURFACE GLOSS

CROSS-REFERENCE TO PRIOR APPLICATIONS

This application is a National Stage of PCT/EP2015/060420, filed May 12, 2015, and designating the United States (published on Nov. 19, 2015, as WO 2015/173214A1), which claims priority under 35 U.S.C. § 119 to European Patent Application No. 14168704.6, filed May 16, 2014, each hereby expressly incorporated by reference in its entirety and each assigned to the assignee hereof.

TECHNICAL FIELD

The invention relates to a three component composition for the manufacture of polyurethane cementitious hybrid flooring or coating, a method for the manufacture of the flooring or coating with the three component composition and the flooring or coating obtainable by the method.

BACKGROUND OF THE INVENTION

Cementitions flooring compositions are well known and widely used where smooth and chemically and mechanically resistant flooring solutions are required. In many such applications, epoxy resin based flooring compositions offer a suitable solution, also due to the fact that they often provide aesthetically pleasing and glossy surfaces. On the other hand, epoxy resin based flooring compositions suffer from certain disadvantages. For example, undesired blushing effects may occur, especially at lower temperatures. Also gloss intensity is often influenced by temperature and may decrease on cold environments. Furthermore, the chemicals involved (i.e. epoxides and amines) are increasingly considered hazardous by European Union Regulation REACH, so that an alternative chemistry to overcome such limitations is desirable.

Polyurethane (PU) cementitious hybrid systems are known to offer an alternative solution for the preparation of coating and flooring products that have outstanding mechanical properties and do not suffer from the drawbacks associated with epoxy resin compositions. However, such PU hybrid systems generally exhibit dull or matt surfaces, which is an unfavorable restriction with respect to aesthetic demands, as the visual aspect of the surface of a coating or flooring is an important feature. Furthermore, dull or matt surfaces are sometimes difficult to clean, for gloss is often associated with surface smoothness.

Polyurethane cementitious hybrid systems are complex systems wherein during curing of the precursor components two main reactions occur, namely the reaction of a polyol and a polyisocyanate to form the polyurethane and the reaction of cement and water, generally called hydration. Upon hydration the cement is hardened to a solid material. The hydration is usually effected in the presence of aggregates such as sand or gravel so that the aggregate particles are bound together by the cement material to obtain mortar or concrete.

Since both reactions take place in the same mixture, it is almost unavoidable that unwanted side reactions occur. Specifically, the reactive isocyanate compounds can react with water resulting in the generation of amine compounds and $CO_2$ gas. The generation of $CO_2$ is a problem since it may lead to blister formation. Moreover, the formation of amines prompts a consecutive side reaction since the isocyanate compounds also react with amines to form urea compounds.

Due to the complex reactions and side reactions, it is difficult to modify the systems without affecting mechanical and workability characteristics and open time. In order to diminish unwanted side reactions and to maintain a sufficiently long shelf life, such PU cementitious hybrid systems use a three component composition, including basically a water/polyol component, a hardener (polyisocyanate) component, and a cement component. With such a three component setup it is possible to create stable compositions which yield smooth, mechanically and chemically resistant flooring surfaces after mixing and application. However, as mentioned before, they generally produce rather dull or matt surfaces which do not exhibit the appealing gloss of epoxy resin based compositions and are often difficult to clean.

SUMMARY OF THE INVENTION

Therefore, the object of the present invention is to provide a composition for polyurethane cementitious hybrid systems which exhibit surfaces with improved gloss and smoothness and simultaneously have outstanding mechanical and workability properties as well as chemical resistance.

Furthermore, blister formation due to unwanted side reactions is to be avoided as much as possible.

Surprisingly, this object could be achieved by using a three component composition including a polyol component containing at least two polyols, one with high and one with low molecular weight, and water, a methylene diphenyl diisocyanate (MDI) product component containing either MDI with an average functionality of at least 2.5, or MDI with an average functionality of 2 which has been partially pre-polymerised with at least one further polyol, and a powder component. Moreover, further improved results can be achieved when the water-polyol component, in particular the water content contained therein, is adapted in an appropriate manner with respect to the content of the other ingredients in the composition.

Accordingly, the present invention relates to a three component composition consisting of a polyol component (A) comprising at least one polyol P1a with an average molecular weight of between 800 and 30'000 g/mol, at least one polyol P1b with an average molecular weight of between 48 and 800 g/mol, and water, a polyisocyanate component (B) comprising a methylene diphenyl diisocyanate product with an average NCO functionality of at least 2.5, or a methylene diphenyl diisocyanate product with an average NCO functionality of at least 2 containing at least one further polyol P2 with an amount of between 1 and 30% based on the weight of component (B) which at least partially reacted with the methylene diphenyl diisocyanate product, and a powder component (C) comprising at least one hydraulic binder, preferably cement and/or calcined paper sludge, furthermore preferably a calcium compound selected from calcium hydroxide and/or calcium oxide, and optionally one or more aggregates.

The inventive three component composition can be used as self-levelling or self-smoothing screed or mortar and unexpectedly enables manufacture of polyurethane cementitious hybrid flooring systems exhibiting significantly improved gloss so that glossy/semiglossy surfaces can be achieved.

Nevertheless, the characteristics as to workability, open time, mechanical properties such as compressive strength are outstanding. Also resistance towards chemical degradation is excellent. Moreover, blister formation can be avoided, which may positively affect the surface appearance.

Further benefits are moisture tolerance and fast curing within a period of one day or even less than 15 h for a wide range of temperatures. A top sealer is not necessary so that complete application within one day is possible. Compressive strengths of e.g. 50 N/mm$^2$ after 24 h can be achieved. The finished products are easy to clean due to their smooth and glossy surface and resistant to stains and scratches. Limitations imposed by REACH can be overcome and the system can be partly based on renewable raw materials such as castor oil and recycled waste materials such as calcined paper sludge.

The system of the invention is particularly suited as a polyurethane cementitious hybrid self-levelling screed with glossy/semiglossy surface in combination with heavy duty demands for flooring, especially industrial flooring.

DETAILED DESCRIPTION OF THE INVENTION

Substance names beginning with "poly", such as e.g. polyol or polyisocyanate, designate substances which formally contain, per molecule, two or more of the functional groups occurring in their names.

The term "open time" is understood to mean the duration of processability when the components are mixed with each other. The end of the open time is usually associated with viscosity increase of the composition such that processing of the composition is no longer possible.

The average molecular weight is understood to mean the number average molecular weight, as determined using conventional methods, preferably by gel permeation-chromatography (GPC) using polystyrene as standard (Mw), styrene-divinylbenzene gel with porosity of 100 Angstrom, 1000 Angstrom and 10000 Angstrom as the column and tetrahydrofuran as a solvent, at 35° C.

The compressive strength is determined according to EN 13892-2 (DIN EN 196-1) after 1d, 7d and 28d of curing at 23° C./50% relative humidity.

Gloss of the cured samples is determined by using a reflection meter according to EN ISO 2813 using angles of 20°, 60°, and 85°, respectively. The temperatures of the temperature-dependent gloss measurements, as well as the corresponding ambient relative humidity are given with the results, where appropriate.

Tests for chemical resistance of the cured samples are performed according to DIN EN 1504-2 with a range of liquid test chemicals in which the samples are immersed during 42 days and afterwards evaluated concerning damages.

The term average functionality in this document describes the average number of functional groups on a given molecule. For, e.g., a polyisocyanate, a functionality of 2 would describe a polyisocyanate molecule with in average 2 isocyanate groups per molecule.

The term workability encompasses many interrelated terms such as flowability, consistency, mobility, pumpability, plasticity, compactability, stability, and finishibility. These terms are usually of qualitative type. Herein, workability refers to flow/consistency which is determined at 23° C./50% relative humidity using the cone as described in DIN EN 1015-3, but without tamping the material. 1 kg of material (at 23° C./50% relative humidity) is used, 30 sec Component A; 1 min A+B 400 U/min, and 2 min, A+B+C to 700 U/min. The cone is set on the glass sheet, filled to the rim, lifted and the diameter of the resulting circle is determined after 5 min.

The composition of the invention consists of three individual components, which are stored separately in order to avoid spontaneous reaction, and are combined when a polyurethane cementitious hybrid flooring or coating is to be prepared. The components may be assembled together as a package. The three components are a polyol component (A), a polyisocyanate component (B) and a powder component (C) which are also simply referred to as component (A), component (B), and component (C), respectively, which are described in the following.

Polyol Component (A)

The polyol component (A) comprises at least one polyol P1a with an average molecular weight of 800 to 30'000 g/mol, at least one polyol P1b with an with an average molecular weight of 48 to 800 g/mol, and water. Optionally, one or more additives may be added.

Examples of suitable polyols P1a are polyoxyalkylenepolyols, also referred to as "polyetherpolyols", polyesterpolyols, polycarbonatepolyols, poly(meth)acrylate polyols, polyhydrocarbon-polyols, polyhydroxy-functional acrylonitrile/butadiene copolymers and mixtures thereof, in particular diols thereof, and mixtures thereof.

Examples of polyetherpolyols are polyoxyethylenepolyols, polyoxypropylenepolyols and polyoxybutylenepolyols, in particular polyoxyethylenediols, polyoxypropylenediols, polyoxybutylenediols, polyoxyethylenetriols and polyoxypropylenetriols. Polyoxyalkylenediols or polyoxyalkylenetriols having a degree of unsaturation of less than 0.02 meq/g and having an average molecular weight in the range from 1000 to 30'000 g/mol and polyoxyethylenediols, polyoxyethylenetriols, polyoxypropylenediols and polyoxypropylenetriols having an average molecular weight of from 800 to 8'000 g/mol are appropriate.

Further examples of polyetherpolyols are so-called ethylene oxide-terminated ("EO-endcapped", ethylene oxide-end-capped) polyoxypropylenepolyols, styrene-acrylonitrile-grafted polyetherpolyols, e.g. Lupranol® from Elastogran GmbH, Germany.

Particularly preferred polyols P1a to be used in the present invention are polyhydroxy-functional fats and/or oils, for example natural fats and/or oils, such as castor oil, or polyols obtained by chemical modification of natural fats and/or oils, so-called oleochemical polyols. Castor oil is particularly preferred.

Examples of chemically modified natural fats and/or oils are polyols obtained from epoxypolyesters or epoxypolyethers obtained, for example, by epoxidation of unsaturated oils, by subsequent ring opening with carboxylic acids or alcohols, polyols obtained by hydroformylation and hydrogenation of unsaturated oils, or polyols which are obtained from natural fats and/or oils by degradation processes, such as alcoholysis or ozonolysis, and subsequent chemical linkage, for example by transesterification or dimerization, of the degradation products thus obtained or derivatives thereof. Also suitable are polyols obtained by polyoxyalkylation of natural oils, such as castor oil, for example available under the trade name Lupranol Balance® by Elastogran GmbH, Germany. Suitable degradation products of natural fats and/or oils are in particular fatty acids and fatty alcohols and fatty acid esters, in particular the methyl esters (FAME), which can be derivatized, for example, by hydroformylation and hydrogenation to give hydroxy-fatty acid esters.

The polyols P1a mentioned above usually have a relatively high molecular weight of between 800 and 30'000 g/mol, preferably between 850 and 20'000 g/mol, more preferably between 900 and 10'000 g/mol, and preferably an average OH functionality in the range from 1.6 to 3.

Examples of suitable polyols P1b are low molecular weight di- or polyhydric alcohols, with a molecular weight of 48 to 800 g/mol. Examples thereof are C2 to C12 alkyl diols, such as 1,2-ethanediol ((mono)ethylene glycol), 1,2- and 1,3-propanediol, neopentylglycol, diethylene glycol, triethylene glycol, the isomeric dipropylene glycols and tripropylene glycols, the isomeric butanediols (such as 1,2-, 1,3-, and 1,4-butandediol), pentanediols, hexanediols, heptanediols, octanediols, nonanediols, decanediols, undecanediols, 1,3- and 1,4-cyclohexanedimethanol, hydrogenated bisphenol A, dimeric fatty alcohols, 1,1,1-trimethylolethane, 1,1,1-trimethylolpropane, glycerol, pentaerythritol, sugar alcohols, such as xylitol, sorbitol or mannitol, sugars, such as sucrose, other alcohols having a higher functionality, low molecular weight alkoxylation products of the abovementioned di- and polyhydric alcohols, and mixtures thereof.

The polyols P1b mentioned above usually have a relatively low molecular weight, for instance, an average molecular weight of from 48 to 800 g/mol, preferably 60 to 600 g/mol, more preferably 60 to 400 g/mol, most preferably 60 to 300 g/mol and an average OH functionality in the range of 1.6 to 6, preferably 2 to 5, more preferably 2 to 4. Especially preferred polyols P1b are ethylene glycol or triethylene glycol.

In order to achieve the inventive improved gloss, at least one high molecular weight polyol P1a and at least one low molecular polyol P1b are used in combination in polyol component (A).

In a preferred embodiment component (A) comprises said polyol P1a with an amount of 20 to 75%, preferably 25 to 70%, more preferably 30 to 60%, most preferably 35 to 50% by weight, based on the total weight of component (A), and said polyol P1b with an amount of 1 to 25%, preferably 2 to 20%, more preferably 5 to 20%, most preferably 5 to 15% by weight, based on the total weight of component (A).

Component (A) furthermore comprises water, in a preferred embodiment with an amount of 20 to 40%, preferably 22 to 35%, more preferably 24 to 30% by weight, based on the total weight of component (A), and/or wherein the weight ratio of water to polyol P1b is in the range of 0.8 to 40, preferably 1.6 to 20, more preferably 2 to 6, and/or wherein the weight ratio of water in component (A) to hydraulic binder in component (C) is in the range of 0.1 to 0.7. Preferably all those conditions are met simultaneously.

Apart from the one or more polyols and water, component (A) may contain further additives. Such additives are commonly used, if desired, and typically known to the persons skilled in the art of polyurethanes. Examples of optional additives are plasticizers, pigments, adhesion promoters, such as silanes, e.g. epoxysilanes, (meth)acrylatosilanes and alkylsilanes, stabilizers against heat, light, and UV radiation, thixotropic agents, flow improving additives, flame retardants, surface active agents such as defoamers, wetting agents, flow control agents, deaerating agents, biocides and emulsifiers.

Preferably used optional additives for component (A) are one or more plasticizers, such as benzoates (benzoate esters), benzyl phthalates, e.g. Santicizer®160 (benzylbutyl phthalate), citric acid esters, e.g. Citrofol®B II (acetyltributyl citrate), ethoxylated castor oil, stearates (preferably ethylene oxide modified), propyleneglycol laurates, and diisopropylbenzene, e.g. Benzoflex®9-88.

In a preferred embodiment, component (A) comprises 10 to 30%, preferably 15 to 25% by weight of a plasticizer, based on the total weight of component (A).

Other suitable additives include pigments, such as inorganic and organic pigments, e.g. Bayferrox® and Heucosin®, defoamers, such as solvent silicon free and polyorganosiloxane, e.g. Tego®Airex and Efka®, and emulsifiers such as calcium hydroxide and calcium oxide.

While component (A) can be prepared without an emulsifier, the addition of an emulsifier may be suitable since the emulsifier increases stability of component (A) when the emulsion is prepared. A suitable emulsifier is calcium hydroxide. The content of the emulsifier, preferably calcium hydroxide, in component (A) may be up to 0.5% by weight, preferably in the range of 0.01 to 0.5% by weight based on the total weight of component (A).

Polyisocyanate Component (B)

The polyisocyanate component (B) comprises a methylene diphenyl diisocyanate (MDI) product with an average NCO functionality of at least 2.5, or a methylene diphenyl diisocyanate (MDI) product with an average NCO functionality of at least 2 and at least one polyol P2 with an amount of between 1% and 30%, preferably between 5% and 25%, more preferably between 10% and 20%, based on the weight of said polyisocyanate component (B), wherein said MDI product and said polyol have reacted at least partially.

In the following methylene diphenyl diisocyanate is abbreviated as "MDI" as usual. A plurality of different MDI product grades is available. MDI products can be classified into monomeric MDI (MMDI) also referred to as pure MDI and polymeric MDI (PMDI) also referred to as technical MDI. Such MDI products are commercially available. The MDI product is preferably monomeric MDI or polymeric MDI or a mixture of monomeric MDI and polymeric MDI.

There exists three isomers of MDI, namely 4,4'-methylene diphenyl diisocyanate (4,4'-MDI), 2,4'-methylene diphenyl diisocyanate (2,4'-MDI), and 2,2'-methylene diphenyl diisocyanate (2,2'-MDI).

It should be mentioned that polymeric MDI is a common designation for MDI products including a mixture of MDI isomers or a single isomer and oligomeric species as outlined above and explained in more detail below. The term "polymeric" in polymeric MDI does not necessarily mean that polymeric MDI contains common polymers of MDI.

Monomeric MDI or pure MDI is a MDI product of a single MDI isomer or isomer mixtures of two or three MDI isomers. The isomeric ratio of MDI isomers can vary in wide ranges. For instance, 4,4'-MDI is a colorless to yellowish solid having a melting point of 39.5° C. Commercial monomeric MDI is often a mixture of 4,4'-MDI, 2,4'-MDI and typically very low levels of 2,2'-MDI.

Polymeric MDI is an MDI product including oligomeric species in addition to MDI isomers. Thus, polymeric MDI contains a single MDI isomer or isomer mixtures of two or three MDI isomers, the balance being oligomeric species. Polymeric MDI tends to have isocyanate functionalities of higher than 2. The isomeric ratio as well as the amount of oligomeric species can vary in wide ranges in these products. For instance, polymeric MDI may typically contain about 30 to 80% by weight of MDI isomers, the balance being said oligomeric species. As in the case of monomeric MDI, the MDI isomers are often a mixture of 4,4'-MDI, 2,4'-MDI and very low levels of 2,2'-MDI. Polymeric MDI is typically a brown or dark amber liquid product at room temperature (23° C.).

The oligomeric species are oligomers having a NCO functionality of 3 or higher. The oligomeric species are a result of the synthesis process and can be represented by the following formula

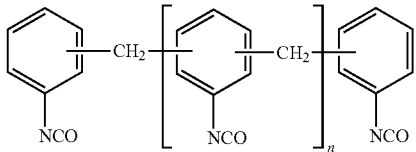

wherein n is 1 to 4 and higher. The amount of the homologues generally decreases with increasing chain length. The total content of homologues with n higher than 4 is generally not very high.

Surprisingly, higher average NCO functionality leads to glossier products when used according to the present invention. For the present invention, a NCO functionality of 2.5 or higher, preferably 2.7 or higher, is preferred. However, improved gloss effect can also be achieved with a lower average NCO functionality of at least 2, if at least one polyol P2 is added to or was present in the MDI component (B).

A wide variety of polymeric MDI grades is available with varying characteristics as to the number, type and content of isomers and oligomeric species, isomeric ratio, and weight distribution of the oligomeric homologues. These characteristics depend on type and conditions of synthesis and purification procedures. Moreover, the characteristics can be adjusted, e.g., by mixing different MDI product grades according to the needs of the customer.

MDI products including monomeric MDI and polymeric MDI are commercially available, e.g. Isonate®, Papi® and Voranate® from Dow, Lupranat® from BASF, Baytec®Enc 88 or Baytec®Enc 5003 from Bayer, or Suprasec® from Huntsman.

The MDI product may be momomeric MDI or polymeric MDI, wherein polymeric MDI is generally preferred. The total content of MDI isomers in polymeric MDI may vary. The polymeric MDI (PMDI) used may contain e.g. 55 to 65% by weight and preferably 35 to 45% by weight of MDI isomers (4,4'-MDI and optionally 2,4'-MDI and/or 2,2'-MDI), based on the total weight of the MDI product, the balance being said oligomeric species.

Apart from MDI product, component (B) may contain at least one polyurethane prepolymer which can be formed by adding at least one polyol P2, a molecule with one or more hydroxyl groups that are reactive with isocyanates, to the MDI product and leaving it react for a certain amount of time, preferably with elevated temperature. Suitable conditions include, e.g. 12 h at 40° C. The polyol is added in amounts of between 1% and 30%, preferably between 5% and 25%, more preferably between 10% and 20%, based on the total weight of component (B). This sub-stoichiometric addition leads to a partial reaction of the MDI product with the polyol, forming polyurethane-prepolymers.

Surprisingly is was found that such an addition of one or more polyols to component (B) leads to a strong increase in surface gloss of the cured three component polyurethane cementitious hybrid flooring product.

Suitable polyols P2 are essentially the same as the polyols used in component (A). Preferred are polyoxyalkylenepolyols, also referred to as "polyetherpolyols", polyesterpolyols, polyoxyethylenediols, polyoxyethylenetriols, polyoxypropylenediols and polyoxypropylenetriols having an average molecular weight of from 400 to 8'000 g/mol. Especially preferred are blends of natural polyols such as castor oil with polyoxyalkylenpolyols, blends with keton resins, mixtures thereof, and the like.

Component (B) may optionally comprise in addition to the MDI product with an average NCO functionality of 2.5 or higher, or the MDI product with an average NCO functionality of 2 or higher and one or more polyols P2, one or more additives such as catalysts in relatively small amounts, e.g. less then 4% by weight, preferably less then 1% by weight, more preferably up to 0.05% by weight of additives altogether, based on the total of component (B). It is, however, generally preferred that component (B) consists essentially of the MDI product with an average functionality of >2.5 or the reaction product of parts of the MDI product with an average functionality of >2 with the added polyol P2, the MDI being preferably monomeric MDI or polymeric MDI or mixtures thereof, if at all including only small amounts of additives, e.g. less then 1% by weight, e.g. up to 0.05% by weight of additives altogether. However, since the MDI products are technical products, they may, of course, include low quantities of impurities.

Powder Component (C)

Component (C) is a powder comprising at least one hydraulic binder, preferably cement and/or calcined paper sludge.

In a preferred embodiment, cement is used as hydraulic binder. As cement, any conventional cement type or a mixture of two or more conventional cement types may be used, for example, cements classified according to DIN EN 197-1: Portland cement (CEM I), Portland composite cement (CEM II), blast furnace cement (CEM III), pozzolanic cement (CEM IV) and composite cement (CEM V). These main types are divided into 27 subtypes, known to those skilled in the art. Of course, cements produced in accordance with another standard, such as according to ASTM Standard or Indian Standard are also suitable.

Portland cement is the most common type of cement and appropriate for the present invention. A preferred type of cement is white cement, such a white cement I-52:5. or 42,5 R. White cement is a Portland cement with a low iron oxide content. It is similar to ordinary, gray Portland cement except for its high degree of whiteness.

Another preferred embodiment uses calcined paper sludge as hydraulic binder, alone or in combination with cement or other hydraulic binders. Paper sludge is a well-known waste product of paper production and in particular a waste product formed during de-inking of recycled paper. The latter paper sludge is also called deinked sludge or deinked paper sludge. Paper sludge originating from the deinking process of recycled paper is preferred.

The paper sludge is usually dried before it is calcined. The dried paper sludge is calcined to form calcined paper sludge. Calcination is a known process where the product is subjected to heat treatment. The calcination conditions may vary to a large extent depending on the composition of the paper sludge, the desired characteristics of the product and the duration of the heat treatment. By calcining the paper sludge the organic content is at least partially removed and the latent puzzolanic properties of the mineral content are activated. The calcined paper sludge is preferably carbon-free.

The calcined paper sludge may be prepared by subjecting the substantially dried paper sludge to temperatures e.g. in the range of from 350 to 900° C., preferably from 500 to 850° C. and more preferably from 650 to 800° C. The heat treatment may last e.g. from 1 to 8 h, preferably 2 to 5 h. The heat treatment may be effected e.g. in a simple furnace or a fluidized bed combustion system.

Particularly preferred calcined paper sludge is obtained from the process described in WO 96/06057 by CDEM Minerals BV, Netherlands, where paper sludge is calcined at a temperature in the range of 720 to 850° C. A fluidized bed system is used for heat treatment.

Calcined paper sludge is commercially available, for instance from CDEM Minerals BV, Netherlands, under the trade name TopCrete® which is preferably used in the present invention. TopCrete® is a zero carbon material.

Calcined paper sludge is usually present in form of a powder. The color typically ranges from white to beige.

The precise composition of calcined paper sludge strongly depends on the chemistry of the paper residue inputs and the thermal conditions applied. Usually, the main ingredients of calcined paper sludge are calcium compounds such as CaO, $Ca(OH)_2$ and $CaCO_3$, and kaolinite or preferably metakaolinite. The calcined paper sludge may e.g. comprise, expressed as % oxides, $SiO_2$ (e.g. 10-40 wt.-%, preferably 15-35 wt. %), CaO (e.g. 20-90 wt. %, preferably 25-60 wt. % or 30-45 wt. %), $Al_2O_3$ (e.g. 5-30 wt. %, preferably 13-20 wt. %), MgO (e.g. 1-7 wt. %, preferably 2-4 wt. %), and other metal oxides (e.g. each less than 1 wt. %). The calcined paper sludge may also contain volatile material, for instance in the form of $Ca(OH)_2$ or $CaCO_3$ or organic material the content of which strongly depends on raw material used and the heat treatment conditions applied.

Apart from cement and/or calcined paper sludge, also other hydraulic binders, such as fly ash or slag may be used in the present invention.

Component (C) preferably further comprises a calcium compound selected from calcium hydroxide and/or calcium oxide. Calcium hydroxide is also known as hydrated lime, calcium oxide is also known as burnt lime. Calcium hydroxide and calcium oxide can each be purchased as a white powder. The calcium compound selected from calcium hydroxide and/or calcium oxide may play an important role in the composition by controlling workability and by avoiding blister formation. It is generally preferred to use either calcium hydroxide or calcium oxide, but a mixture of calcium hydroxide and calcium oxide can also be used.

In addition, component (C) comprises in preferred embodiments one or more aggregates. Aggregates are chemically inert, solid particulate materials. Aggregates come in various shapes, sizes, and materials ranging from fine particles of sand to large, coarse rocks. Examples of suitable aggregates are sand, such as silica sand, gravel, and crushed stone, slag, calcined flint, lightweight aggregates as clay, bentonite, pumice, perlite, and vermiculite. Sand, in particular silica sand, is preferably used to reach the workability expected and to obtain a smooth surface.

The grain size of the aggregates is preferably rather small, e.g. less than 2 mm The aggregate may have, for instance, a grain size in the range of 0.06 to 2 mm, wherein sand, in particular silica sand, having a grain size in the range of 0.1 to 1 mm is particularly preferred. For instance, sand having a grain size ranging from 0.3 to 0.8 mm or from 0.1 to 0.5 mm can be advantageously used in the present invention. The grain size range can be determined, e.g. by sieve analysis.

The use of aggregates depends largely on the desired application. Especially for highly self-levelling products or very thin coating applications, omitting aggregates completely may be advantageous. The skilled artisan is able to adjust the type and amount of aggregates to the desired workability properties and end-use of the product.

Component (C) may optionally comprise one or more additives which are commonly used, if desired, and typically known to the persons skilled in the art of cement applications. Examples of suitable additives, which may be optionally used in component (C), are superplastizicers such as polycarboxylate ethers (PCE); mineral oil, fibres such as cellulose fibres, and inorganic or organic pigments.

Suitable Proportions for the Three Component Composition

By adjusting the proportions of the ingredients within the components and between the components as well in a suitable manner, the improvements of the present invention can be significantly enhanced. Such suitable proportions are described in the following. The ingredients indicated refer to the ingredients in the particular component as discussed above. Ratios referring to ingredients in different components relate to suitable or correct proportions of each component according to operating instructions, i.e. to the mixing ratios to be used for mixing the three components and, in use to the mixture of the three components prepared.

The three component composition of the invention is in one preferred embodiment containing aggregates formulated such that the following proportions are satisfied:
a) the content of water is in the range of 3.5 to 5% by weight, preferably in the range of 4.1 to 4.6% by weight,
b) the content of MDI product is in the range of 15 to 18% by weight, preferably in the range of 16 to 17% by weight, and
c) the content of hydraulic binder is in the range of 16 to 20% by weight, preferably in the range of 17 to 18% by weight, based on the total weight of component (A), component (B) and component (C).

In another preferred embodiment not containing aggregates such as sand, the three component composition of the invention is formulated such that the following proportions are satisfied:
a) the content of water is in the range of 5 to 15% by weight, preferably in the range of 9 to 11% by weight,
b) the content of MDI product is in the range of 30 to 50% by weight, preferably in the range of 35 to 45% by weight, and
c) the content of hydraulic binder is in the range of 25 to 45% by weight, preferably in the range of 30 to 40% by weight, based on the total weight of component (A), component (B) and component (C).

Differences in the amount of water can influence not only the finished surface of the product but also the physical properties such as compression strength, workability and open time. Therefore, the proportion of water with respect to the other ingredients is to be determined carefully.

In the powder component, the calcium compound selected from calcium hydroxide (hydrated lime) and/or calcium oxide can play an important role, depending on the application. The presence of a calcium compound selected from calcium hydroxide and/or calcium oxide may efficiently prevent the formation of bubbles or blisters on the cured product's surface due to the formation of $CO_2$ by the reaction of the isocyanate compounds and water present in component (A). However, too high amounts may hinder the workability of the system. Calcium oxide upon hydration forms calcium hydroxide and thus serves the same purpose as the calcium hydroxide.

The content of the calcium compound selected from calcium hydroxide and/or calcium oxide may be, e.g., in the range of 1 to 4% by weight, preferably in the range of 3 to 3.5% by weight, based on the total weight of component (A), component (B) and component (C).

Moreover, the three component composition of the invention is preferably formulated such that at least one, preferably all, of the following weight ratios is satisfied:
a) the weight ratio of water to MDI product is in the range of 0.2 to 0.3 preferably in the range of 0.24 to 0.26,
b) the weight ratio of water to cement is in the range of 0.2 to 0.3, preferably in the range of 0.21 to 0.27, and/or
c) the weight ratio of hydraulic binder to MDI product is in the range of 0.8 to 1.6, preferably in the range of 0.9 to 1.4.

The weight ratio of water to the calcium compound selected from calcium hydroxide and/or calcium oxide in the three component composition is e.g. generally in the range of 1 to 4.5 and preferably in the range of 1.2 to 3.

The molar ratio of polyol hydroxyl groups in component (A) to MDI isocyanate groups in component (B) is preferably in the range of from 0.1 to 0.4. Said molar ratio further improves compressive strength of the finished product. The molar ratio can easily be determined via the equivalent weights of the polyols and polyisocyanates used.

The following proportions given for component (A) and for component (C) are preferred ranges, but it should be considered that these proportions depend to a considerable extent also on the mixing ratio of the three components to be used. Thus, the ranges indicated are particularly suitable for a mixing ratio by weight of components (A), (B) and (C) of about 16.5:16.5:67. Similar results may be achieved, when e.g. the proportion of component (C) in the mixing ratio is increased and the content of cement and calcium compound in component (C) is decreased at the same time. If aggregates are omitted in component (C), the total volume of component (C) may be considerably lower and a mixing ratio by weight of components (A), (B) and (C) of about 33.3:33.3:33.3 is easily possible, which may facilitate certain application processes.

Component (A) is preferably formulated such that the water content is in the range of 20 to 40% by weight, preferably 22 to 35% by weight, and in particular 24 to 30% by weight, and/or the content of polyol P1a is in the range of 20 to 75% by weight, preferably 25 to 70% by weight, more preferably 30 to 60% by weight, most preferably 35 to 50% by weight, and the content of polyol P1b is in the range of 1 to 25% by weight, preferably 2 to 20% by weight, more preferably 5 to 20% by weight, most preferably 5 to 15% by weight, each based on the total weight of component (A).

In one preferred embodiment, component (C) is formulated such that at least one, preferably all, of the following conditions is fulfilled, each based on the total weight of component (C):
a) the cement content is in the range of 20 to 30% by weight, preferably 25 to 29% by weight,
b) the content of calcium compound selected from calcium hydroxide and/or calcium oxide is in the range of 1 to 6% by weight or 2 to 6% by weight, preferably 4.5 to 5.5% by weight,
c) the aggregates content, preferably sand, is in the range of 65 to 80% by weight, preferably 68 to 70% by weight.

In another preferred embodiment, for instance suitable for thin layer top coat applications, component (C) is formulated such that at least one, preferably all, of the following conditions is fulfilled, each based on the total weight of component (C):
a) the cement content is in the range of 90 to 99% by weight, preferably 91 to 95% by weight,
b) the content of calcium compound selected from calcium hydroxide and/or calcium oxide is in the range of 1 to 6% by weight or 2 to 6% by weight, preferably 4.5 to 5.5% by weight.

In preferred embodiments, both component (A) and component (C) are formulated according to the proportions outlined above. Moreover, it is preferred that component (B) either consists essentially of the MDI product with average functionality of at least 2.5, or of a reaction product of the MDI product with average functionality of at least 2 and polyol P2.

As to the mixing ratio of components (A), (B) and (C), the weight ratio of component (A) to component (B) is preferably in the range of 0.7 to 1.4, and more preferably in the range of 0.9 to 1.2. The weight ratio of components (A+B) to component (C) is preferably in the range of 0.4 to 2.1, and more preferably in the range of 0.4 to 0.5 if component (C) contains aggregates such as sand, or more preferably in the range of 1.9 to 2.1, if component (C) does not contain aggregates such as sand, wherein components (A+B) represents the combined weight of component (A) and component (B). A particularly preferred mixing ratio by weight of components (A), (B) and (C) is about 16.5:16.5:67 if component (C) contains aggregates such as sand, or about 33.3:33.3:33.3 if component (C) does not contain aggregates such as sand. Said mixing ratios are particularly preferred, if components (A), (B) and (C) are formulated according to the proportions outlined above.

Method for the Manufacture of a Polyurethane Cementitious Hybrid Flooring or Coating The three component composition of the invention is suitable to prepare a polyurethane cementitious hybrid flooring or coating. The method comprises
a) mixing polyol component (A) and polyisocyanate component (B),
b) adding the powder component (C) to the mixture of polyol component (A) and polyisocyanate component (B) and mixing, to obtain a mixed material,
c) applying the mixed material to a substrate,
d) optionally smoothing the applied mixed material, and
e) curing the applied mixed material, to obtain the polyurethane cementitious hybrid flooring or coating.

A typical layer thickness e.g. ranges from 2 to 6 mm. The application temperature is preferably from about 12 to 35° C. Fast curing in less than 24 h for a wide range of temperatures can be achieved. Application of a top sealer is not required so that one day application is possible.

High compressive strengths can be achieved. The compressive strength of the flooring or coating obtained is preferably at least 45 N/mm$^2$, e.g. in the range of 45 to 55 N/m$^2$, preferably in the range of 50 to 55 N/m$^2$ at 23° C./50% relative humidity measured 1 day after application, and preferably at least 50 N/mm$^2$, more preferably at least 58 N/mm$^2$, e.g. in the range of 58 to 68 N/m$^2$, preferably 62 to 65 N/m$^2$ after 28 days.

Three component compositions described herein are especially suitable as a self-levelling system or screed. The mixing and curing of such compositions as described herein according to the invention provides flooring and coating systems having a glossy/semiglossy surface of more than 20 GU, in preferred embodiments exhibiting gloss values of more than 30 GU, more preferably more than 40 GU, more preferably more than 50 GU, even more preferably more than 60 GU, especially preferably more than 70 GU, most preferably more than 80 GU based on the gloss measurement method according to EN ISO 2813, and outstanding properties as to mechanical properties such as compressive strength, open time and workability, as well as chemical and mechanical resistance. The flooring or coating obtained by mixing and curing such a composition according to the present invention is an aspect of the present invention.

Another aspect of the present invention is the use of a three component composition as described herein as a polyurethane cementitious hybrid flooring or coating, wherein the cured composition exhibit a surface gloss of more than 20 GU, preferably more than 30 GU, more preferably more than 40 GU, more preferably more than 50 GU, even more preferably more than 60 GU, especially preferably more than 70 GU, most preferably more than 80 GU, based on the gloss measurement method according to EN ISO 2813.

A further aspect of the present invention is the use of a methylene diphenyl diisocyanate (MDI) product with an average NCO functionality of at least 2.5, preferably at least 2.7, or a MDI product with an average NCO functionality of at least 2 that has reacted partially with a polyol P2 as described in detail further above, in a polyurethane cementitious hybrid flooring or coating, characterised in that said polyurethane cementitious hybrid flooring or coating exhibits a surface gloss of more than 20 GU, preferably more than 30 GU, more preferably more than 40 GU, more preferably more than 50 GU, even more preferably more than 60 GU, especially preferably more than 70 GU, most preferably more than 80 GU, based on the gloss measurement method according to EN ISO 2813.

The invention is further explained in the following experimental part which, however shall not be construed as limiting the scope of the invention. The proportions and percentage indicated are by weight, unless otherwise stated.

EXAMPLES

Reference Examples

Two reference compositions for flooring applications were used or produced as follows.

Reference Composition R-1

Reference composition R-1 consists of a two-component epoxy resin-based composition suitable for flooring. It is a commercially available, ready-made composition sold under the trade name SikaFloor® 264, e.g. by Sika Germany. After curing, this composition exhibited a glossy surface (see gloss measurements below).

Reference Composition R-2

Reference composition R-2 not according to the present invention is a three-component polyurethane cementitious hybrid flooring composition using a component (B) not according to the present invention comprising a MDI product with an average NCO functionality of 2.3 and no polyol P2. The composition is shown in Table 1.

TABLE 1

Composition of reference example R-2, a three-component polyurethane cementitious hybrid flooring composition not according to the present invention. Component (B) comprises an MDI product with an average NCO functionality of 2.3 and no polyol P2.

| Ingredient | Weight % based on total composition |
|---|---|
| Component (A) | |
| Castor oil LV-117 (polyol P1a) | 6.1 |
| Triethylene glycol (polyol P1b) | 1.3 |
| Citrofol BII (plasticizer) | 2.7 |
| Tego Airex 944 (defoamer) | 0.2 |
| Bayferrox (pigment) | 1.7 |
| Water | 4.5 |

TABLE 1-continued

Composition of reference example R-2, a three-component polyurethane cementitious hybrid flooring composition not according to the present invention. Component (B) comprises an MDI product with an average NCO functionality of 2.3 and no polyol P2.

| Ingredient | Weight % based on total composition |
|---|---|
| Component (B) | |
| Suprasec ® 2652 (MDI by Huntsman Corp.) | 16.5 |
| Component (C) | |
| Silica sand 0.1-0.5 mm | 49.5 |
| White cement CEM 1 52,5 N | 16.8 |
| Calcium hydroxide (hydrated lime) | 0.7 |

For curing, the three components were mixed in a weight ratio of A:B:C=16.5:16.5:67. After curing, this composition exhibited a matt surface (see gloss measurements below).

Examples of Compositions According to Invention

The example compositions according to the invention were prepared in a similar manner as reference composition R-2 in a three-component approach. Details for the components (A), (B), and (C) are given below.

Component (A)

The ingredients indicated below were mixed to form component (A). The amounts given are in parts by mass.

| Ingredient | Weight % based on weight of component (A) |
|---|---|
| Component (A) | |
| Castor oil LV-117 (polyol P1a) | 37 |
| Triethylene glycol (polyol P1b) | 8 |
| Citrofol BII (plasticizer) | 17 |
| Tego Airex 944 (defoamer) | 1 |
| Bayferrox (pigment) | 10 |
| Water | 27 |

Component (B)

Component (B) in the example inventive compositions C-1 to C-11 consisted of an MDI product with an average NCO functionality of at least 2 to which a polyol was added in order to obtain a partially prepolymerised polyurethane product. Addition of a polyol to the MDI product led in all cases to a partial reaction of the MDI with the polyol. By means of GPC the increase of high molecular weight species could be determined.

Component (B) in the example inventive composition C-12 consisted of an MDI product with an average NCO functionality of 2.5 (Suprasec® 2655 by Huntsman Corp.). For example inventive composition C-13, an MDI product with a functionality of 2.7 was used (Suprasec 2211® by Huntsman Corp.), and for example inventive composition C-14, another MDI product with a functionality of 2.7 was used (Suprasec 5025® by Huntsman Corp.). Example inventive compositions C-13 and C-14 did not contain any polyol P2 in component (B).

Prepolymerisation in Component (B)

The components (B) for the example compositions C-1 to C-11 according to the present invention were prepared by mixing a certain weight percentage of polyol P2 (percentage of the total weight of the component (B)) in MDI during 12 h at 40° C. All experiments C-1 to C-11 were done using polyol P2 in Suprasec® 2496 (MDI product by Huntsman Corp.) without any further additives. Table 2 gives the exact compositions of the components (B) used in the compositions C-1 to C11 according to the present invention.

TABLE 2

Polyols used in inventive examples C-1 to C-11 to be added to component (B) including their weight percentages based on the total weight of component (B).

| Entry | Composition | Weight % | Polyol P2 in component (B) Type (producer) |
|---|---|---|---|
| 1 | C-1 | 10 | Albodur 912 (Alberdingk Boley GmbH) |
| 2 | C-2 | 15 | Albodur 912 (Alberdingk Boley GmbH) |
| 3 | C-3 | 10 | Desmophen 1150 (Bayer MaterialScience AG) |
| 4 | C-4 | 20 | Desmophen 1150 (Bayer MaterialScience AG) |
| 5 | C-5 | 10 | Desmophen 1111 BD (Bayer Mat. Sci. AG) |
| 6 | C-6 | 20 | Desmophen 1111 BD (Bayer Mat. Sci. AG) |
| 7 | C-7 | 10 | Voranol CP 1050 (Dow Chemical) |
| 8 | C-8 | 20 | Voranol CP 1050 (Dow Chemical) |
| 9 | C-9 | 5 | Voranol P 400 (Dow Chemical) |
| 10 | C-10 | 10 | Voranol P 400 (Dow Chemical) |
| 11 | C-11 | 20 | Voranol P 400 (Dow Chemical) |

The thus obtained mixtures were used as components (B) in the exemplary inventive polyurethane cementitious hybrid flooring compositions.

Component (C)

The ingredients indicated below were mixed to form component (C). The amounts given are in parts by mass.

| Ingredient Component (C) | Weight % based on weight of component (C) |
|---|---|
| Silica sand 0.1-0.5 mm | 74 |
| White cement CEM 1 52,5 N | 25 |
| Calcium hydroxide (hydrated lime) | 1 |

Composition Mixture

Components (A), (B) and (C) are mixed in a weight ratio to obtain a mixture as indicated below, e.g. a weight ratio of about 16.5, 16.5 and 67, respectively, was used. The portion of each ingredient is given in % by weight, based on the total weight of the mixture A+B+C.

| | A + B + C (%) |
|---|---|
| Castor oil LV-117 (polyol P1a) | 6.1 |
| Triethylene glycol (polyol P1b) | 1.3 |
| Citrofol BII (plasticizer) | 2.7 |
| Tego Airex 944 (defoamer) | 0.2 |
| Bayferrox (pigment) | 1.7 |
| Water | 4.5 |
| MDI product | 16.5 |
| Silica sand, 0.1-0.5 mm | 49.5 |
| Calcium hydroxide | 0.7 |
| White cement CEM 1 52,5 N | 16.8 |

A number of variants have been studied within the indicated range. The workability of the mixed material indicated was found to be appropriate. The mixed material was applied to a substrate in order to perform a typical flooring application. The flooring obtained exhibited a pleasantly glossy surface appearance.

With respect to the system indicated, the proportion of water in the system was studied in various laboratory tests in view of application, workability and open time. It was determined that the range of percentage of water in component (A) for this system should be preferably from 24% to 27%. Amounts less than 24% may lead to formation of blisters, as well as a decrease in workability. Higher amounts, for example more than 27%, may negatively influence the surface gloss of the cured composition.

In the system indicated with a proportion of white cement of 26%, an outstanding compressive strength of the finished flooring is achieved, namely more than 50 N/mm² after 28 days. Decreasing the amount of cement in this system result in a decrease in compressive strength achieved. Apart from that, the proportion of cement in the system influences workability and open time.

The content of hydrated lime in component (C) is preferably about 5%. If considerably lower amounts are used, blister formation may occur. Too high amounts of hydrated lime reduce workability of the system.

In order to test the influence of the ratio of component A to component B, the weight ratio of component A to component B was varied while maintaining the ratio of the weight sum of components A and B compared to weight of component (C) as shown below.

| (A + B) % | A:B | C % |
|---|---|---|
| 33 | 0.8 | 67 |
| 33 | 1 | 67 |
| 33 | 1.2 | 67 |
| 33 | 1.4 | 67 |

While the tests all show satisfactory results, the best compromise between workability and surface appearance was achieved with a ratio of A:B=1. Workability decreases for A:B>1. On the other hand, some blister formation may occur at a temperature of higher than 35° C. when A:B<<1.

Also the quality of the surface gloss is influenced by the ratio of the components A, B, and C and their individual compositions. Some preferred ratios are shown below in Table 5.

Gloss Measurements

Gloss was measured according to EN ISO 2813. Depending on the gloss intensity, one of three gloss grades was attributed to each measurement. Thus measured values of >70 GU (gloss units) are considered "high gloss", values between 20 and 70 GU "medium gloss", and values below 20 GU "matt", in accordance with EN ISO 2813. Normally, the samples are measured at an incident angle of 60°. However, very glossy samples are often measured at 20° for higher accuracy, and likewise, rather matt samples are measured at an angle of 85°. All samples were prepared in film of 3 mm thickness after curing at 23° C. and 50% rel. humidity during 24 h.

Gloss Measurements on Reference Compositions

The results of the gloss measurements of reference compositions R-1 and R-2 are presented in Table 3.

TABLE 3

Results of the surface gloss measurements on reference compositions R-1 and R-2..

| | | | Rel. | Angle 60° | | Angle 85° | |
|---|---|---|---|---|---|---|---|
| Entry | Composition | Temperature [° C.] | Humidity [%] | Gloss [GU] | Gloss grade | Gloss [GU] | Gloss grade |
| 1 | R-1 | 12 | 80 | 30 | Medium | n/a | n/a |
| 2 | R-1 | 23 | 50 | n/a | n/a | 90 | High |

TABLE 3-continued

Results of the surface gloss measurements on
reference compositions R-1 and R-2..

| Entry | Com-position | Temperature [° C.] | Rel. Humidity [%] | Angle 60° Gloss [GU] | Angle 60° Gloss grade | Angle 85° Gloss [GU] | Angle 85° Gloss grade |
|---|---|---|---|---|---|---|---|
| 3 | R-2 | 12 | 80 | <20 | Matt | n/a | n/a |
| 4 | R-2 | 23 | 50 | <20 | Matt | n/a | n/a |
| 5 | R-2 | 35 | 30 | <20 | Matt | n/a | n/a |

Epoxy resin-based composition R-1 expectedly shows high gloss (Table 3, entry 2). However, at lower ambient temperatures the surface gloss decreases considerably (entry 1). Conventional polyurethane cementitious hybrid composition R-2 shows very low surface gloss at all temperatures (Table 3, entries 3 to 5).

Gloss Measurements on Inventive Compositions

The gloss measurements of the inventive examples C-1 to C-14 were all performed at 23° C. and 50% rel. humidity, since in polyurethane cementitous hybrid systems surface gloss is much less temperature-dependent than in epoxy resin systems. The results are shown in Table 4.

TABLE 4

Results of the surface gloss measurements on inventive
examples C-1 to C-14, measured at 23° C.

| Entry | Compo-sition | Angle 60° Gloss [GU] | Angle 60° Gloss grade | Angle 85° Gloss [GU] | Angle 85° Gloss grade |
|---|---|---|---|---|---|
| 1 | C-1 | 73 | High | 79 | High |
| 2 | C-2 | 80 | High | 83 | High |
| 3 | C-3 | 74 | High | 75 | High |
| 4 | C-4 | 62 | Medium | n/a | n/a |
| 5 | C-5 | 62 | Medium | n/a | n/a |
| 6 | C-6 | 71 | High | 81 | High |
| 7 | C-7 | 61 | Medium | n/a | n/a |
| 8 | C-8 | 62 | Medium | n/a | n/a |
| 9 | C-9 | 62 | Medium | n/a | n/a |
| 10 | C-10 | 64 | Medium | n/a | n/a |
| 11 | C-11 | 65 | Medium | n/a | n/a |
| 12 | C-12 | 53 | Medium | 64 | Medium |
| 13 | C-13 | 25 | Medium | 34 | Medium |
| 14 | C-14 | 33 | Medium | 40 | Medium |

"n/a" means no measurement was performed.

It is apparent that in all inventive samples the surface gloss was significantly higher than in the chemically comparable reference sample R-2. In some cases (entries 1, 2, and 6) the surface gloss reached values that are normally only reached by epoxy-resin systems (such as R-1).

In order to illustrate the influence of the relative amount of some key ingredients (i.e. water and polyol P1b) on surface gloss, some inventive compositions and one reference composition were prepared as listed in Table 5 with varying amounts of those ingredients in component (A). For these experiments, the amount of P1b in the respective components (A) was varied. All other ingredients as well as components (B) and (C) remained the same as listed above for inventive example C-14, except for the amount of polyol P1a in component (A), which was adjusted for each composition to obtain in all cases a total weight percentage of polyol (P1a+P1b) of 45% based on the total weight of component (A). For better comparability, the compositions with the same amount of water (between 24% and 30%) in component A were named with the same composition number (e.g., C-15), but different indices (a to i).

TABLE 5

Results (in GU) of the surface gloss measurements on inventive
examples C-15a-d to C-18a-d and R-3, measured at 23° C.
with an angle of 60°. The ratio of A:B:C was in all cases
16.5:16.5:67. The percentages given are weight percentages
based on the total weight of composition (A).

| | | Component (A) | | | | |
|---|---|---|---|---|---|---|
| Entry | Composition | P1a (%) | P1b (%) | Water (%) | Gloss [GU] | Grade |
| 1 | C-15a | 44 | 1 | 24 | 21 | Medium |
| 2 | C-15b | 40 | 5 | 24 | 46 | Medium |
| 3 | C-15c | 35 | 10 | 24 | 48 | Medium |
| 4 | C-15d | 20 | 15 | 24 | 65 | Medium |
| 5 | R-3 | 45 | 0 | 25 | 5 | Matt |
| 6 | C-16b | 44 | 1 | 25 | 25 | Medium |
| 7 | C-16c | 42 | 3 | 25 | 93 | High |
| 8 | C-16d | 40 | 5 | 25 | 68 | Medium |
| 9 | C-16e | 35 | 10 | 25 | 75 | High |
| 10 | C-16f | 30 | 15 | 25 | 78 | High |
| 11 | C-16g | 25 | 20 | 25 | 11 | Matt |
| 12 | C-16h | 20 | 25 | 25 | 10 | Matt |
| 13 | C-16i | 15 | 30 | 25 | 5 | Matt |
| 14 | C-17a | 44 | 1 | 27 | 28 | Medium |
| 15 | C-17b | 40 | 5 | 27 | 80 | High |
| 16 | C-17c | 35 | 10 | 27 | 91 | High |
| 17 | C-17d | 30 | 15 | 27 | 85 | High |
| 18 | C-17e | 25 | 20 | 27 | 11 | Matt |
| 19 | C-18a | 44 | 1 | 30 | 21 | Medium |
| 20 | C-18b | 40 | 5 | 30 | 57 | Medium |
| 21 | C-18c | 35 | 10 | 30 | 65 | Medium |
| 22 | C-18d | 30 | 15 | 30 | 72 | High |

The results in Table 5 show that the extent of surface gloss can be optimized by a careful adjustment of the key ingredients of component (A). The absence of polyol P1b (as in R-3) leads to a matt surface.

Likewise, also the mixing ratio of components (A), (B), and (C) can have an influence on the surface gloss of the cured three component product. This is illustrated in Table 6, using as an example component (A) of inventive composition C-16d (with 25% by weight of water and 5% by weight of polyol P1b in component (A), based on the total weight of component (A)). In these examples, component (C) was always 67% and the sum of (A+B) was always 33% of the weight of the total composition (A+B+C), while the weight ratio of A:B was varied.

TABLE 5

Results (in GU) of the surface gloss measurements with varying
ratios of components (A), (B), and (C) measured at 23°
C. with an angle of 60°. The compositions of the individual
components were the same as in inventive example C-16d.

| Entry | (A + B) (%) | C (%) | A:B | Surface gloss (GU) |
|---|---|---|---|---|
| 1 | 33 | 67 | 1:0.7 | 27 |
| 2 | 33 | 67 | 1:0.9 | 35 |
| 3 | 33 | 67 | 1:1 | 68 |
| 4 | 33 | 67 | 1:1.1 | 60 |
| 5 | 33 | 67 | 1:1.3 | 65 |
| 6 | 33 | 67 | 1:1.4 | 73 |

Table 5 shows that while the inventive three component composition allows for some freedom with respect to the mixing ratio of the three components (A), (B), and (C) for the invention to work, the mixing ratio still has a significant influence on the extent of surface gloss of the cured composition. The person skilled in the art is advised to adjust also the mixing ratios of the three components in order to obtain an optimal surface gloss, and not only the individual compositions themselves.

Chemical Resistance

The chemical resistance, i.e. resistance of samples against degradation by chemicals, was measured according to DIN EN 1504-2. Cured test samples (curing time 24 h at 23° C. and 50% rel. humidity) were immersed into different liquid test chemicals during a period of 42 days and subsequently evaluated for damages. The damage classification was done according to the grades listed in Table 7.

TABLE 7

Damage classification and grades of resistance assigned to the results of the chemical resistance tests. Higher grade of resistance means lower damage by a test chemical.

| Classification | Grade of resistance | Descripton |
|---|---|---|
| A | 7 | 0-20% loss of hardness |
| AD | 6 | 0-20% loss of hardness/colour deterioration |
| B | 5 | 20-40% loss of hardness |
| BD | 4 | 20-40% loss of hardness/colour deterioration |
| C | 3 | >40% loss of hardness |
| C1 | 2 | >40% loss of hardness, small blisters |
| C2 | 1 | >40% loss of hardness, big blisters |
| C3 | 0 | Sample destroyed |

The results of the chemical resistance test were as follows, listed in Table 8. The test chemicals were used according to EN 13529:2003 with the compositions of the media groups specified therein.

TABLE 8

Grades of resistance of reference samples R-2 and inventive samples C-1 against various chemicals, according to EN 13529:2003 and DIN EN 1504-2.

| | Test chemical (media group | Grade of resistance | |
|---|---|---|---|
| Entry | according to EN 13529:2003) | R-2 (Ref.) | C-1 (Inv.) |
| 1 | Fuel (1) | 6 | 6 |
| 2 | Aviation fuel (2.1) | n/a | 7 |
| 3 | Domestic fuel oil, testing mixture F (according to DIN ISO 1817) (3) | 6 | 7 |
| 4 | Hydrocarbons: 60 vol. % toluene, 30 vol. % xylene, methylnapthaline (4) | 6 | 6 |
| 5 | Crude oil (4b) | 6 | 6 |
| 6 | Used oils with flash point < 50° C. (4c) | 6 | 7 |
| 7 | Mono- and poly alcohols (5) | 6 | 6 |
| 8 | Methanol (5a) | 2 | 3 |
| 9 | 10% aqueous acetic acid (9) | 6 | 6 |
| 10 | 50 vol. % acetic acid, 50 vol. % propionic acid (9a) | 4 | 4 |
| 11 | 20% sulphuric acid (10) | 6 | 7 |
| 12 | 20% sodium hydroxide solution (11) | 6 | 7 |
| 13 | 20% aqueous solution of sodium chloride (12) | 6 | 7 |
| 14 | Tenside solution: 3% Protektol KLC 50, 2% Marlophen NP 9.5, 95% water (14.1) | 6 | 7 |

In all tests, the samples made from composition C-1 (formulated according to the invention) show the same or better chemical resistance compared to the reference samples R-2 which were made from a comparable conventional polyurethane hybrid flooring composition.

The invention claimed is:

1. Three component composition consisting of
   a) a polyol component (A) comprising:
      at least one polyol P1a with an average molecular weight of 800 g/mol to 30,000 g/mol, and
      at least one polyol P1b with an average molecular weight of 48 g/mol to 800 g/mol, and
      water, and
   b) a polyisocyanate component (B) comprising:
      a monomeric or polymeric methylene diphenyl diisocyanate (MDI) with an average NCO functionality of at least 2.5; or
      a monomeric or polymeric methylene diphenyl diisocyanate (MDI) with an average NCO functionality of at least 2 and less than 2.5 and further comprising at least one polyol P2 in an amount of between 1% and 30% by weight, based on the total weight of said polyisocyanate component (B), wherein said MDI having an average NCO functionality of at least 2 and less than 2.5 and said polyol P2 have reacted at least partially, and
   c) a powder component (C) comprising at least one hydraulic binder,
   wherein component (A) comprises said polyol P1a in an amount of 20% to 75% by weight, based on the total weight of component (A), and said polyol P1b in an amount of 2% to 15% by weight, based on the total weight of component (A).

2. Three component composition according to claim 1, wherein the at least one polyol P1a of component (A) is a polyhydroxy-functional natural oil or fat.

3. Three component composition according to claim 1, wherein at least one polyol P1b of component (A) has an average OH functionality of 1.6 to 6, and/or is selected from C2 to C12 alkyl diols, glycerol, sugars, or oligomers thereof.

4. Three component composition according to claim 1, wherein component (A) comprises water in an amount of 20% to 40%, based on the total weight of component (A), and/or wherein the weight ratio of water to polyol P1b is in the range of 0.8 to 40, and/or wherein the weight ratio of water in component (A) to hydraulic binder in component (C) is in the range of 0.1 to 0.7.

5. Three component composition according to claim 1, wherein the polyisocyanate component (B) consists essentially of monomeric or polymeric methylene diphenyl diisocyanate (MDI) with an average NCO functionality of at least 2.5.

6. Three component composition according to claim 1, wherein the polyisocyanate component (B) comprises at least one polyol P2 selected from polyhydroxy-functional polyoxyalkylene, polyhydroxy-functional polyester, polyhydroxy-functional polyoxyalkylated alcohol, or polyhydroxy-functional polyoxyalkylated natural oil.

7. Three component composition according to claim 1, wherein the weight ratio of component (A) to component (B) is in the range of 0.7 to 1.4, and/or wherein the weight ratio of components (A+B) to component (C) is in the range of 0.4 to 2.1, wherein components (A+B) represents the combined weight of component (A) and component (B).

8. Three component composition according to claim 1, wherein the molar ratio of polyol hydroxyl groups in component (A) to MDI isocyanate groups in component (B) is in the range of 0.1 to 0.4.

9. Three component composition according to claim 1, wherein component (C) comprises
   a) 70% to 97% by weight of at least one hydraulic binder, and
   b) 3% to 30% by weight of a calcium compound selected from calcium hydroxide and/or calcium oxide,
based on the total weight of component (C).

10. Three component composition according to claim 1, wherein component (C) comprises a) 20% to 30% by weight of at least one hydraulic binder,
b) 1% to 6% by weight of a calcium compound selected from calcium hydroxide and/or calcium oxide, and
c) 65% to 80% by weight of aggregates based on the total weight of component (C).

11. A method of manufacturing a polyurethane cementitious hybrid flooring or coating with a three component composition according to claim 1, wherein the method comprises
   a) mixing polyol component (A) and polyisocyanate component (B),
   b) adding the powder component (C) to the mixture of polyol component (A) and polyisocyanate component (B) and mixing, to obtain a mixed material,
   c) applying the mixed material to a substrate,
   d) optionally, smoothing the applied mixed material, and
   e) curing the applied mixed material, to obtain the polyurethane cementitious hybrid flooring or coating.

12. Polyurethane cementitious hybrid flooring or coating obtained by mixing and curing a composition according to claim 1, wherein said flooring or coating exhibits a surface gloss of more than 30 GU, based on the gloss measurement method according to EN ISO 2813.

13. The component composition according to claim 1, wherein at least one polyol P1a of component (A) is castor oil.

14. The component composition according to claim 1, wherein the powder component (C) comprises cement and/or calcined paper sludge.

* * * * *